United States Patent [19]

Forrer

[11] Patent Number: 4,841,913
[45] Date of Patent: Jun. 27, 1989

[54] AUTOMATIC SOLID FOOD DISPENSER FOR DOMESTIC ANIMALS

[76] Inventor: Christian Forrer, Lieudit Carmagnole, Route de Fumel, F-47300 Villeneuve, France

[21] Appl. No.: 102,404

[22] Filed: Sep. 29, 1987

[30] Foreign Application Priority Data

Oct. 9, 1986 [FR] France ................................ 86 14276

[51] Int. Cl.⁴ ................................................ A01K 5/02
[52] U.S. Cl. .................................... 119/51.12; 119/63
[58] Field of Search ................. 119/51.11, 51.12, 51.5, 119/53, 56 R, 52 R, 63; 222/322, 650

[56] References Cited

U.S. PATENT DOCUMENTS

| 1,020,790 | 3/1912 | Baker | 119/63 X |
|---|---|---|---|
| 3,450,101 | 6/1969 | Avrea | 119/51.11 |
| 3,568,893 | 3/1971 | Becker | 222/517 X |
| 3,741,162 | 6/1973 | Lopez | 119/51.13 |
| 3,762,373 | 10/1973 | Grossman | 119/51.11 |
| 3,898,960 | 8/1975 | Gilchrist | 119/63 X |
| 4,079,699 | 3/1978 | Longmore et al. | 119/51.11 |
| 4,235,200 | 11/1980 | Shay | 119/51.11 |
| 4,279,221 | 7/1981 | Arvizu | 119/51.11 |
| 4,422,409 | 12/1983 | Walker et al. | 119/51.11 |
| 4,497,280 | 2/1985 | Sanstrom et al. | 119/51.11 |

FOREIGN PATENT DOCUMENTS

| 259211 | 4/1913 | Fed. Rep. of Germany . |
|---|---|---|
| 2067608 | 8/1971 | France . |
| 2518366 | 6/1983 | France . |
| 2565066 | 12/1985 | France . |
| 2165526 | 4/1986 | United Kingdom ............. 119/51.11 |

Primary Examiner—Robert P. Swiatek
Attorney, Agent, or Firm—Young & Thompson

[57] ABSTRACT

The automatic distributor of sequential rations of solid food for domestic animals comprises a tank (3) for solid food and a bin (6) receiving the rations as well as a control device enabling to program the number of rations delivered within 24 hours and the time interval separating them. The tank (3) for solid food and the bin (6) are both parts of a casing (1) and are rigidly fast the one to the other. The tank (3) comprises a lower aperture giving access to the bin (6) and an obturator (8), actuated by an electric motor (16) is displaceable between a rest position for which the tank (3) is separated from the bin (6), and a feeding position for which the tank (3) is connected to the bin (6) and feeds it with solid food by gravity. The upper face of the bin (6) is closed during the filling phase limiting thus the quantity of food delivered.

5 Claims, 2 Drawing Sheets

AUTOMATIC SOLID FOOD DISPENSER FOR DOMESTIC ANIMALS

The present invention relates to an automatic solid food dispenser for domestic animals, for delivering a series of measured quantities of solid food several times a day at predetermined time intervals.

There already exist such automatic solid food dispensers for domestic animals, as disclosed for example in U.S. Pat. Nos. 3,450,101, 3,762,373 and 4,422,409.

These known distributors provide relative movement, in rotation or in translation, between a solid food storage chamber and a cup for dispensing the food, which requires a complicated and delicate mechanism using a motor of relatively high power. This has the disadvantage that the distributors are difficult to operate and their period of operation, when battery powered, is limited by their high electric energy consumption.

Furthermore, in all the existing devices, the quantity of food delivered at a given time is always of a predetermined volume or weight, regardless of the fact that the animal may not have finished its previous meal. This leads to a waste of food and spillage around the dispenser.

The present invention has for its object the provision of an automatic distributor of a series of quantities of food for domestic animals, which is simple and inexpensive and which has an increased operating time compared to existing distributors.

The accompanying drawings show schematically and by way of example one embodiment of a food dispenser according to the invention. In the drawings.

Figure 1:
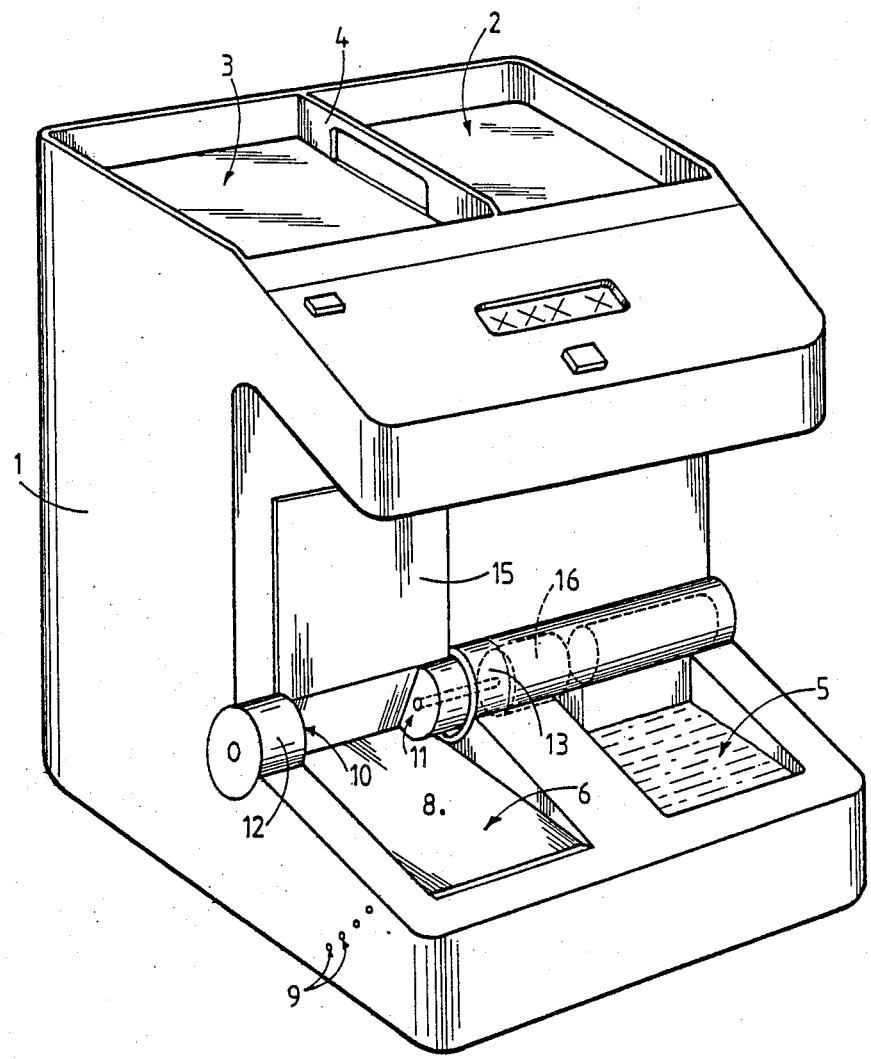
FIG. 1 is a perspective view of a food dispenser according to the present invention, in the position in which the feed of the pellet cup from the pellet storage tank is shut off.

The illustrated embodiment of the automatic distributor of quantities of solid food for domestic animals is shown in combination with a constant level drinking trough. The dispenser comprises a casing 1 having a generally C-shaped cross section. The rear of this casing houses two tanks, a tank 2 adapted to store water and a tank 3 receiving pellets or other solid food. These tanks are separated by a vertical wall 4, the upper portion of which has an opening providing a handle.

The lower leg of the casing 1 comprises two cups 5, 6, the cup 5 communicating with the water tank in a known manner so that the water level in this cup 5 remains constant, and the other cup 6 being adapted to be placed in communication, as will be seen later, with a loading passageway provided by an inclined bottom 7 of the tank 3 for the pellets.

The bottom 8 of the cup 6 for solid food is movable and is pivotally mounted on the casing at its rear. A securement device, in the form of a pin adapted to enter holes 9, permits fixing the desired angular position of the bottom 8. According to the selected position of the bottom 8, the user can modify at will the capacity of the cup 6 and therefore the volume of pellets provided as one meal for the animal.

The dispenser also comprises a valve for the pellet tank, comprised by a member which is cylindrical at its ends 10, 11 and is rotatably mounted in the casing within tubular members 12, 13 disposed in the elbow between the rear and the lower leg of the casing 1. The medial portion 14 of the valve member is cut away to leave a cylindrical segment. The surface along which the cylinder is cut away can be planar, dihedral or curved, so as to avoid any blocking of the rotation of the cylindrical segment through the stored food. This valve also comprises a flap 15, the size and shape of which correspond to those of the cup 6 in order to close the cup 6 when flap 15 is in the FIG. 3 position, that is, when pellets are being fed to the cup. Brushes or resilient blades can be mounted on the rotatable valve or avoid any clogging of the pellets to be distributed during opposite rotative movements of the valve.

The tubular member 13, which serves as a bearing for one of the ends of the valve, is extended to the other end of the casing, past that portion of the distributor which forms the drinking trough.

Figure 2:
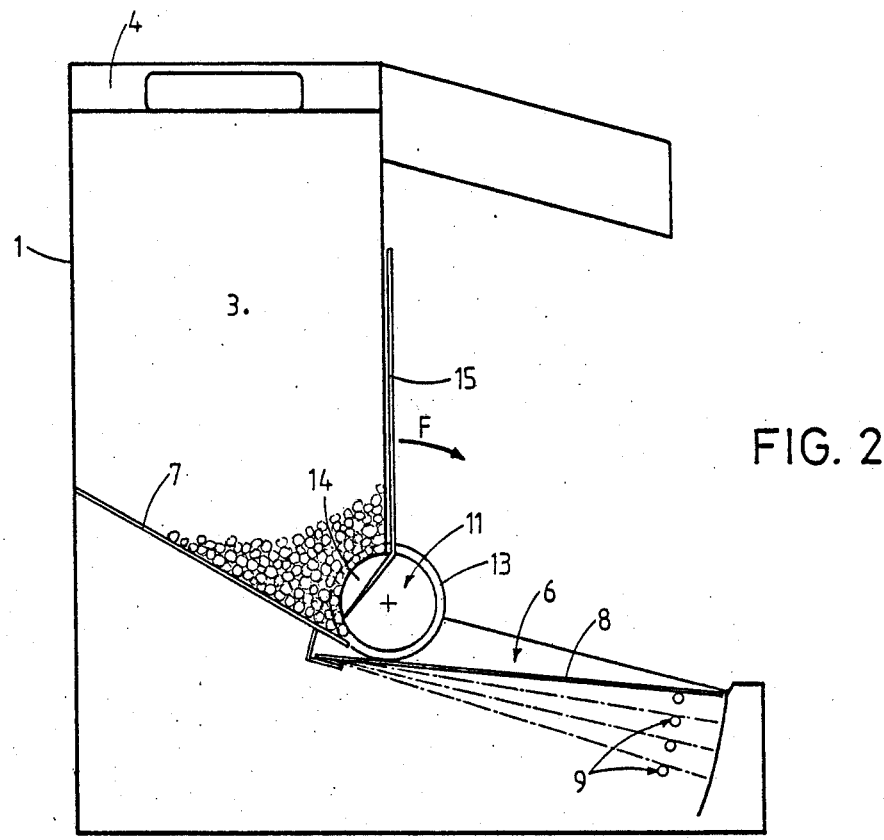
FIG. 2 is a cross section of the distributor in the position it occupies in FIG. 1.
Figure 3:
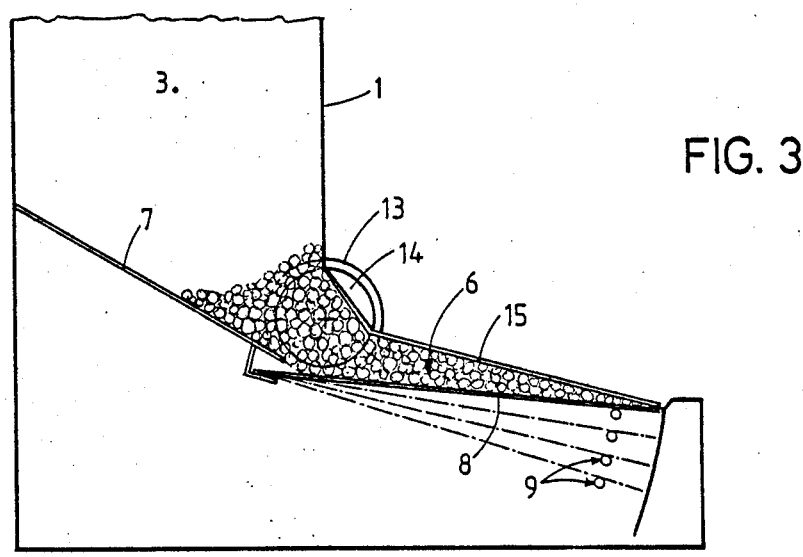
FIG. 3 is a cross section of the distributor during feeding of the cup with pellets from the pellet storage tank.

A small electric motor 16 of low power consumption is housed in the tubular member 13, as well as a reducer (not shown) driven by this motor, the output shaft of which is connected to the rotary valve in order to drive it in opposite directions of rotation between a rest position shown in FIGS. 1 and 2 and a filling position for the cup 6 shown in FIG. 3.

The distributor is also provided with a current supply or battery (not shown) to energize the motor 16, and with a control device housed in the upper leg of the C-shaped casing, comprising a display, an on/stand-by button and a programming member. This control uses common electric circuits and enables programming several times a day at selected times the rotation of the valve in the direction of the array F from its position shown in FIG. 2, to the position shown in FIG. 3. After a delay of a few seconds in this second position to permit filling of the cup 6, the upper side of which is closed by the flap 15, with pellets flowing by gravity from tank 3, the valve member is rotated in the opposite direction to return it to the rest position shown in FIG. 2.

Therefore, by simple rotation of the small diameter cylindrical valve, the passageway feeding the cup 6 is opened and closed. When the passageway is open, the flap 15 closes the upper side of the cup 6, so that only the desired quantity of pellets is introduced into it. If the animal has not fully consumed its preceding meal, only a complementary quantity of pellets is introduced into cup 6 to complete the ration for the following meal.

The diameter of the valve being small, the power necessary to rotate it is greatly reduced. Furthermore, the motor operates only a few seconds per day, and this ensures long working life for the distributor.

During periods of non-use of the distributor, it is on stand-by, maintaining the control circuit under voltage to avoid loss of the program of the number and times of the meals.

The principal advantages of the distributor described above are as follows:

1. There is no relative movement, neither rotative nor rectilinear, between the storage tank for the pellets and the cup, which greatly simplifies the construction and greatly reduces the power necessary for operation.

2. A valve of small diameter making small movements greatly reduces energy consumption and enables the use of a motor of low power, as the torque necessary for operation is reduced.

3. The capacity of the cup 6 can be easily adjusted.

4. The amount of pellets is automatically filled to the desired quantity thanks to the closure flap 15 of the cup 6. The quantity of food delivered is controlled by what remains in the cup from the preceding ration. There is thus a saving of food and the prevention of spillage around the distributor.

It is obvious that modifications can be made. The distributor could include no drinking trough.

The distributor can have tubular parts, fitting into the tanks 2, 3, to increase their capacity.

The valve could be differently made, for example in the form of a linearly displaceable slide, in which case the closure flap secured to it would also be displaced linearly to close and open the upper side of the cup 6.

What is claimed is:

1. An automatic distributor for a series of portions of solid food for domestic animals, comprising a storage tank for solid food, a cup for receiving said solid food, control means to program the frequency of delivery of solid food from the tank to the cup, the tank and the cup being secured to each other by a casing, the tank having a lower access leading to said cup, a valve, an electric motor for moving said valve between a rest position in which the tank and cup are closed from each other by the valve and the upper side of the cup is open, and a feeding position in which the tank and cup communicate with each other for gravity feed of solid food from the tank to the cup, and a flap movable simultaneously with the valve to close the upper side of the cup in said feeding position.

2. A distributor as claimed in claim 1, in which the flap is secured to the valve.

3. A distributor according to claim 2, in which the valve is rotatable.

4. A distributor according to claim 1, in combination with a constant-level drinking trough comprising a second tank and cup in the casing for respectively storing and dispensing water.

5. A distributor according to claim 1, the cup having a bottom, and means for selectively positioning the bottom in any of a plurality of positions of adjustment relative to the casing thereby selectively to adjust the quantities of solid food that can be received by the cup.

* * * * *